US012739299B2

(12) United States Patent
Ramamohan

(10) Patent No.: US 12,739,299 B2
(45) Date of Patent: Sep. 15, 2026

(54) SYSTEMS AND METHODS FOR ROUTING PEER-TO-PEER COMMUNICATIONS VIA TELECOMMUNICATIONS NETWORKS BASED ON BIFURCATED USER-SPECIFIC SENTIMENT ANALYSIS

(71) Applicant: Capital One Services, LLC, McLean, VA (US)

(72) Inventor: Deepak Ramamohan, Mysuru (IN)

(73) Assignee: Capital One Services, LLC, McLean, VA (US)

( * ) Notice: Subject to any disclaimer, the term of this patent is extended or adjusted under 35 U.S.C. 154(b) by 298 days.

(21) Appl. No.: 18/486,237

(22) Filed: Oct. 13, 2023

(65) Prior Publication Data

US 2025/0080605 A1 Mar. 6, 2025

(30) Foreign Application Priority Data

Aug. 31, 2023 (IN) ............................. 202341058425

(51) Int. Cl.
*G06F 40/20* (2020.01)
*H04L 67/1074* (2022.01)

(52) U.S. Cl.
CPC .......... *H04L 67/1078* (2013.01); *G06F 40/20* (2020.01)

(58) Field of Classification Search
CPC ...... G06F 40/30; G06F 40/284; G06F 40/279; G06F 40/35; G06F 16/35; G06F 2203/011; G06F 40/20; G06F 40/289; G06F 18/24; G06F 16/2457; G06F 16/243; G06F 16/24575; G06F 16/353; G06F 40/242
See application file for complete search history.

(56) References Cited

U.S. PATENT DOCUMENTS

| | | | | |
|---|---|---|---|---|
| 11,349,982 | B2 * | 5/2022 | Lee | G06F 40/169 |
| 2021/0005188 | A1 * | 1/2021 | Benkreira | G06F 40/30 |
| 2022/0366197 | A1 | 11/2022 | Mazza et al. | |
| 2023/0027828 | A1 * | 1/2023 | Aguilar Alas | G10L 25/63 |
| 2023/0118506 | A1 * | 4/2023 | Song | G06F 40/117 704/9 |
| 2023/0186906 | A1 * | 6/2023 | Gordon | G06F 40/30 704/254 |
| 2023/0244874 | A1 * | 8/2023 | Shi | G06F 40/30 704/9 |
| 2023/0297781 | A1 * | 9/2023 | Kurian | G06F 40/30 |
| 2024/0176950 | A1 * | 5/2024 | Rani | G06F 40/30 |

* cited by examiner

*Primary Examiner* — Abdelali Serrou
(74) *Attorney, Agent, or Firm* — Foley & Lardner LLP

(57) ABSTRACT

Routing peer-to-peer communications via telecommunications networks based on bifurcated user-specific sentiment analysis may be facilitated. In some embodiments, a system may generate a sentiment value related to each utterance of a set of utterances associated with a user by providing each utterance of the set of utterances to a sentiment machine learning model. The system may bin each utterance into a set of bins based on the sentiment values. The system may determine a sentiment probability of each bin of the set of bins by randomly sampling a subset of utterances corresponding to a respective bin of the set of bins. The system may determine an overall sentiment probability for a transcript based on the determined sentiment probability of each bin. In response to receiving a communication request, the system may route the communication request to an agent based on the overall sentiment probability satisfying a threshold sentiment probability.

20 Claims, 4 Drawing Sheets

400

SYSTEMS AND METHODS FOR ROUTING PEER-TO-PEER COMMUNICATIONS VIA TELECOMMUNICATIONS NETWORKS BASED ON BIFURCATED USER-SPECIFIC SENTIMENT ANALYSIS

CROSS-REFERENCE TO RELATED APPLICATIONS

This application claims the benefit of priority of Indian Provisional Patent No. 202341058425, filed on Aug. 31, 2023. The content of the foregoing application is incorporated herein in its entirety by reference.

BACKGROUND

Sentiment analysis is the use of natural language processing, text analysis, computational linguistics, and biometrics to identify, discover, quantify, study, or extract subjective information. For example, sentiment analysis may be performed on a variety of data, such as social media posts, emails, or other textual data to determine a view of or attitude toward a situation or event. Sentiment models may be used to determine a sentiment of a user; however, sentiment models are often limited by the amount of data they can receive as input. As the size of the input data increases, the accuracy of effectively determining a sentiment within the input data decreases. These and other drawbacks exist.

SUMMARY

Methods and systems are described herein for novel uses and/or improvements to sentiment analysis. As one example, methods and systems are described herein for routing peer-to-peer communications via telecommunications networks based on bifurcated user-specific sentiment analysis. To provide these novel uses and/or improvements to sentiment analysis, the system performs a bifurcated sentiment analysis using an initial classification aimed at reducing noise and a subsequent classification aimed at categorization of utterances. Additionally, the bifurcated sentiment analysis is user-specific in order to better detect nuances in the speech patterns of a given user.

For example, existing systems currently rely on uncalibrated sentiment models that are heavily reliant on copious amounts of both training data (e.g., for labeling patterns in speech transcripts with particular sentiments) and inputted data (e.g., for detecting one or more of the previously labeled patterns in a given transcript). As such, both conventional training and conventional sentiment analysis rely on a "more data" approach (i.e., the more data, the better). However, a "more data" approach creates a fundamental technical burden on computing resources due to the computational infeasibility of processing a large amount of data, particularly in instances where required processing times for generating responses to given inputs approach real-time (e.g., in a chatbot application).

In contrast to a "more data" approach, the system attempts to limit the amount of data that is required to be processed when generating a response. By doing so, the amount and complexing of computing resources required is also reduced. To achieve this goal, the system uses a bifurcated sentiment analysis. The first portion of the bifurcated sentiment analysis aims at reducing noise. For example, as a natural by-product of any "more data" approach, more noise is also generated. The first portion of the bifurcated sentiment analysis aims at reducing this noise through first determining a sentiment value related to each utterance of a set of utterances associated with the user. For example, conventional sentiment analysis relies on processing numerous utterances together because in normal human speech similar ideas and/or contexts important to determining sentiment may be strung across numerous utterances. However, in the context of determining a sentiment of a given user, utterances originating from other users within a transcript introduces a vast amount of unnecessary information (e.g., noise) that may not be relevant to the user's sentiment. As such, conventional sentiment analysis techniques are inherently inaccurate due to the large amount of noise within the input data, and they also waste valuable computing resources that could otherwise be used for other computational tasks.

To overcome this technical issue, the system limits the initial classification to determining a positive or negative sentiment (e.g., a sentiment value) of utterances that originate from the given user. For example, the system may extract utterances that originate from the user as opposed to other users (e.g., a chatbot) that may be part of the input data and generate a sentiment value of each utterance of the user using a sentiment machine learning model. Not only does this limit the amount of computational resources expended by the system (e.g., as input data size is now reduced), but also ensures that the integrity of the input data is maintained (e.g., as contextual information associated with the utterances of the user is still part of the input data) with a reduced amount of noise (e.g., caused by utterances of other users within the transcript). Accordingly, processing this data without the contextual information of other user inputs is less likely to lead to erroneous results.

Having achieved an initial reduction in (i) the amount of data required for processing and (ii) a reduction of noise within the input data via the initial classification, the system may turn to the second portion of the bifurcated sentiment analysis aimed at a categorization of the utterances to improve sentiment analysis classification accuracy for the transcript as a whole. For example, the system may bin each utterance associated with the user into bins based on the generated sentiment values. By binning utterances based on their respective sentiment value, each utterance associated with a given bin may be contextually linked to one another. That is, utterances that are part of a same bin may include contextual information indicating a given sentiment (e.g., positive, negative, neutral, etc.).

To improve sentiment analysis classification accuracy while reducing utilization of computational resources, the system may use the binned utterances to determine a sentiment probability corresponding to each bin of the bins by randomly sampling a subset of utterances within the bins. For example, as each utterance is contextually linked to another within a given bin, the system may randomly sample a subset of utterances from each bin to (i) determine a sentiment probability value indicating that the subset of utterances includes a given sentiment (e.g., a positive, neutral, negative sentiment), and (ii) assign all utterances within the bin the determined sentiment probability value. That is, in contrast to conventional sentiment model techniques that attempt to process the whole transcript using uncalibrated sentiment models (e.g., those that output crude or inaccurate classifications), the system calibrates the initial utterance-level sentiment values by using a randomly sampled subset of the contextually-linked utterances associated with a bin to generate calibrated utterance-level probabilities of a given sentiment. In this way, the system need only process a subset of utterances of each respective bin to determine a sentiment probability value, thereby (i) reducing utilization of computer processing and computer memory resources that would otherwise be wasted by processing all utterances within each bin and (ii) generating a calibrated sentiment classification of user-level utterances.

Using the determined sentiment probabilities associated with each bin of the set of bins, the system may determine an overall sentiment probability for the transcript. For example, the system may combine the determined sentiment probabilities associated with each bin of the bins to determine the overall sentiment probability for the transcript, thereby generating accurate predictions as to whether the entire transcript (e.g., as opposed to a part of) is associated with a given sentiment classification. For instance, as the sentiment probabilities are determined for each bin, to reduce sentiment model classification bias stemming from individual sentiment probabilities of the respective bins, the system may combine the sentiment probabilities assigned to each utterance and/or bin to determine the overall user sentiment of the transcript. In this way, the system may use the calibrated sentiment probabilities to determine a more accurate user sentiment classification for the transcript as a whole. In response to receiving a communication request from the user, the system may route the communication request to an agent based on the overall sentiment probability satisfying a threshold sentiment probability. For instance, leveraging the accurate user sentiment classification of the transcript, the system may use such classification for routing communication requests received from a user. For example, where the overall sentiment probability indicates that a user sentiment is highly negative (e.g., 95% negative), the system may route the communication request to an agent that is specialized in handling negative situations experienced by users, thereby improving the user experience.

In some aspects, the system may generate a sentiment value related to each utterance of a set of utterances associated with a user by providing each utterance of the set of utterances to a sentiment machine learning model, where the set of utterances are extracted from a transcript of a dialogue between the user and a first agent. The system may then bin each utterance of the set of utterances associated with the user into a set of bins based on the sentiment values related to a respective utterance of the set of utterances. The system may then determine a sentiment probability of each bin of the set of bins by randomly sampling a subset of utterances corresponding to a respective bin of the set of bins, where each bin of the set of bins is associated with a range of sentiment values. The system may then determine an overall sentiment probability for the transcript based on the determined sentiment probability of each bin of the set of bins. In response to receiving a communication request from the user, the system may route the communication request to a second agent based on the overall sentiment probability satisfying a threshold sentiment probability.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
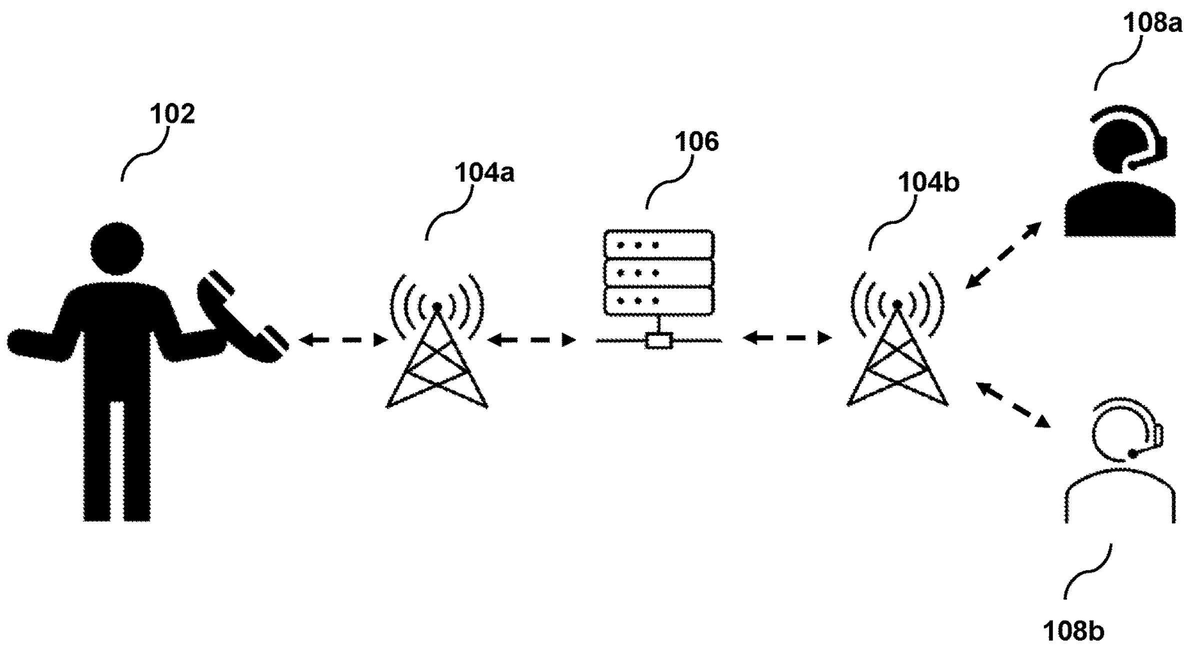
FIG. 1 shows an illustrative diagram for routing peer-to-peer communications via telecommunications networks based on bifurcated user-specific sentiment analysis, in accordance with one or more embodiments.

FIG. 1 shows an illustrative diagram for routing peer-to-peer communications via telecommunications networks based on bifurcated user-specific sentiment analysis, in accordance with one or more embodiments. For example, system 100 may indicate a user 102 providing a communication request over telecommunications network 104*a* to communicate with an agent.

Server 106 may detect the communication request and route the communication request over telecommunications network 104*b* to an agent (e.g., first agent 108*a* or second agent 108*b*) based on a determined user sentiment of user 102. For example, to improve the user experience, the system may determine whether the user (e.g., user 102) is associated with a sentiment classification. The sentiment classification may be positive, negative, neutral, or an other sentiment classification.

In the context of the user being associated with a negative sentiment classification, the system may route the communication request (e.g., an inbound telephone call, a web chat, a video call, an email, or other communication request) to an agent that is highly skilled, prepared, or an expert in handling one or more problems being experienced by the user. For example, where the user is frustrated about a given problem that they are experiencing, the system may use historical information related to the user to route the call to a qualified agent associated with a given assessment value. For instance, the historical information may be previously determined overall sentiment probabilities that are associated with the user from analyzing prior transcripts indicating a dialogue between the user and an agent. Additionally or alternatively, in the context of a real-time or near-real time communication, the system may route the communication to an agent that is qualified to handle one or more problems that the user is currently experiencing. For instance, during a communications session between an agent and a user, the system may automatically route the call to a different agent associated with an assessment value that satisfies a threshold assessment value. In this way, the user experience may be improved by routing communications sessions or communications requests to the most qualified agents to handle one or more problems being experienced by the user.

The system may be used to route peer-to-peer communications via telecommunications networks based on user sentiment. In disclosed embodiments, a user sentiment may include a sentiment classification of a user. In some embodiments, the user sentiment may comprise a positive, neutral, negative, or other sentiment classification (e.g., frustrated, apprehensive, sad, happy, hopeful, etc.). In some embodiments, the user sentiment may comprise a sentiment value. For example, the sentiment value may correspond to a numeric or alphanumeric value indicating a user sentiment. For instance, the sentiment value can be a negative or positive value (e.g., where a negative sentiment value indicates a negative sentiment of the user and a positive sentiment value indicates a positive sentiment of the user), a normalized value (e.g., where 0 indicates a negative sentiment, and a 1 indicates a positive sentiment), or other value.

In disclosed embodiments, a peer-to-peer communication may be a communication request or a communications session between two people. For example, the peer-to-peer communication may be the act or process of one user and another user sharing information over one or more networks (e.g., telecommunications networks, computing networks, satellite networks, etc.). In some embodiments, the peer-to-peer communication may be a user conversing with another user (e.g., an agent, friend, family member, etc.) over a telephone call. In some embodiments, the peer-to-peer communication may be between one or more computers of the user and another user (e.g., where the peer-to-peer communication between the user and the other user is a webchat, an email conversation, a video call, VOIP call, text message conversation, or other dialogue).

The system may be used to determine a sentiment of one or more utterances. In disclosed embodiments, an utterance may be one or more pieces of speech or one or more words. In some embodiments, an utterance may be a sound, a word, a part of a word, a sentence, a phrase, a paragraph, or other textual or audio information associated with speaking. For example, an utterance may include "real words," such as words defined in a dictionary, or may include "nonsense words," such as made-up words or otherwise "not real" words. In some embodiments, utterances may be a combination or sequence of other utterances. For example, an utterance may be a sequence of words, such as a sentence, that is made up of other utterances (e.g., words, sounds, etc.). As such, the system may determine a sentiment of one or more utterances.

The system may be used to reduce utilization of computational resources associated with determining a user sentiment. In disclosed embodiments, computational resources may include resources or other functions of a computer that are used when segmenting data. In some embodiments, computational resources may include computer memory, such as non-volatile memory (flash memory, Solid-State Drive (SSD), magnetic storage, Read-Only Memory (ROM), Erasable Programmable ROM, Hard Disk Drive (HDD), optical disk, etc.), volatile memory (Random Access Memory (RAM), Dynamic Random Access Memory (DRAM), cache memory, Static Random Access Memory (SRAM), register memory, etc.), or other computer memory or storage devices. In some embodiments, computational resources may include computer processors, such as a single-core Central Processing Unit (CPU), dual core CPU, quad-core CPU, hexa-core CPU, octa-core CPU, deca-core CPU, multicore CPU, a set of CPUs, graphical processing units, or other computer processors or processing components. In some embodiments, computational resources may be wall time. For example, wall time may be a maximum time range indicating the time at which a job begins (e.g., processing information, clustering data, segmenting data etc.) to the time at which a job completes, where, during the wall time, a computing device is enabled to access a set of hardware and software components to complete a job.

Figure 2:
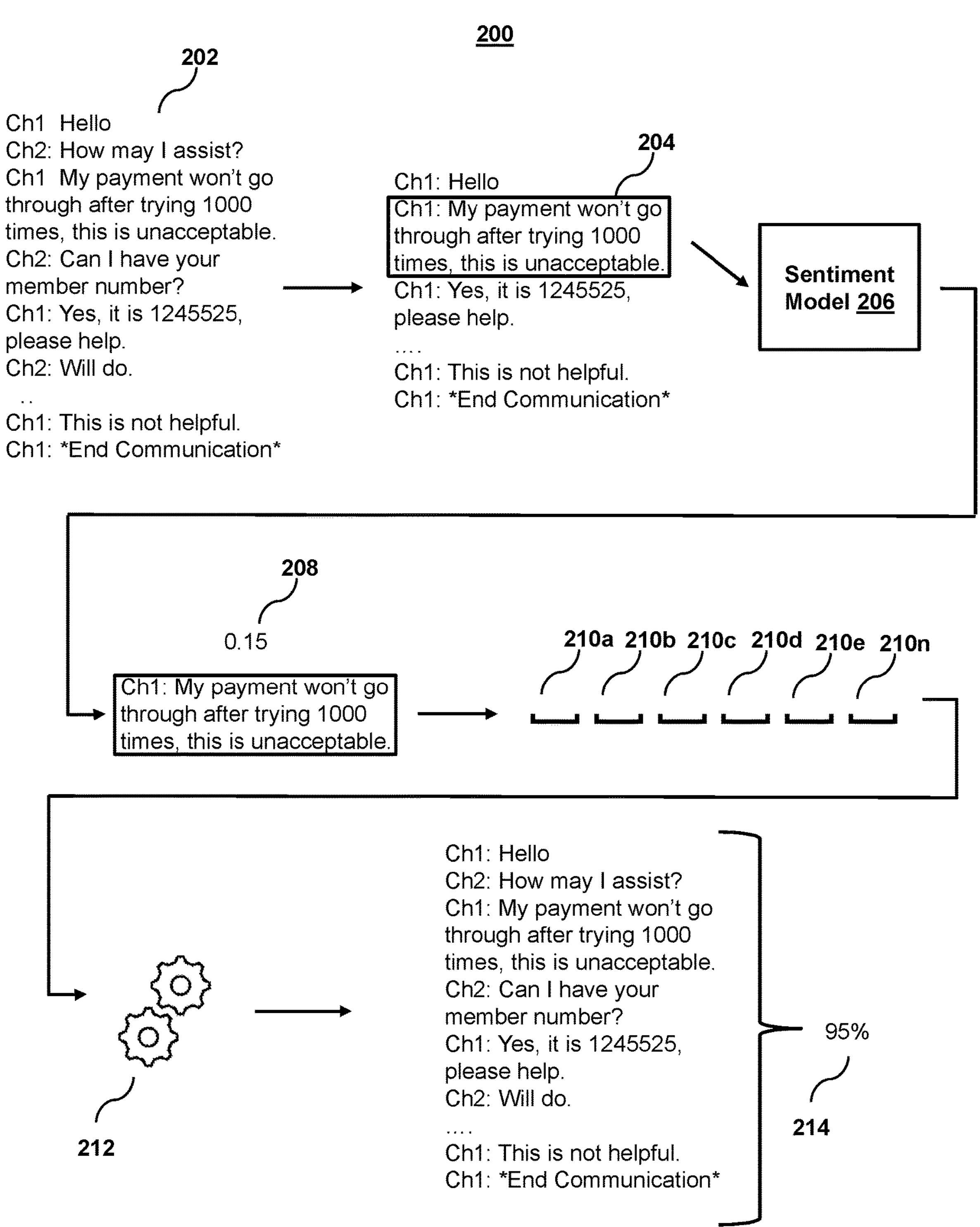
FIG. 2 shows an illustrative diagram for reducing utilization of computational resources associated with determining a user sentiment based on bifurcated user-specific sentiment analysis, in accordance with one or more embodiments.

FIG. 2 shows an illustrative diagram for reducing utilization of computational resources associated with determining a user sentiment based on bifurcated user-specific sentiment analysis, in accordance with one or more embodiments. For example, diagram 200 shows a transcript 202 indicating a dialogue between a user and another user. Transcript 202 may include utterances, such as words, sentences, paragraphs, or other textual information. In some embodiments, transcript 202 may be derived from an audio/video conversation between the user and the other user (e.g., via NLP) on the audio file. To reduce the amount of computer resources conventionally expended or otherwise wasted when determining a user sentiment, the system may generate a sentiment value related to each utterance of a set of utterances associated with a user. For example, the system may extract, from transcript 202, a set of utterances associated with the user. In some embodiments, the extracted set of utterances is not associated with an agent or another user, but with those to which the user sentiment is to be determined. Using the set of extracted utterances (e.g., the set of utterances associated with the user), the system may provide each utterance 204 of the set of utterances associated with the user to a sentiment machine learning model (e.g., sentiment model 206).

Sentiment model 206 may receive each utterance of the set of utterances associated with the user as input, and may generate an output. The output, sentiment value 208, may be a value indicating a sentiment of the utterance. In some embodiments, sentiment model 206 may receive each utterance of the set of utterances one at a time. In this way, the system may reduce the amount of computer processing and computer memory resources utilized by processing utterances of the user one at a time, thereby overcoming the technical disadvantages of existing systems associated with processing an entire transcript at once. In other embodiments, sentiment model 206 may receive each utterance of the set of utterances associated with the user all at once (or differing subsets of the set of utterances associated with the user). In this way, system may generate more accurate predictions related to a user sentiment by using all user utterances which may include contextual information. In yet other embodiments, where sentiment model 206 is of a plurality of sentiment models, each sentiment model may receive each utterance of the set of user utterances (e.g., one at a time, all at once, as subsets of the set of user utterances, etc.) to generate sentiment value 208. Although FIG. 2 shows a single sentiment value 208, one of skill in the art would appreciate that sentiment value 208 would be generated for each utterance of the set of user utterances, in accordance with one or more embodiments.

Using the generated sentiment value 208, the system may bin each utterance of the set of utterances associated with the user into a set of bins. For example, the system may generate bins 210, where each bin is associated with a sentiment value range. For instance, first bin 210*a* may be associated with a sentiment value range of (0,0.1], second bin 210*b* may be associated with a sentiment value range of (0.1,0.2], and so on. That is, where a parenthesis "(" indicates a non-inclusive value and a bracket "[" indicates an inclusive value. As such, first bin 210*a* may be associated with a range of 0.9999999 to 0.1. In other embodiments, for example, a sentiment value range may be [0.0,0.1) indicating a range of 0.0 to 0.9999999, as one of ordinary skill in the art would appreciate. The system may bin each of the utterances associated with the user corresponding to a respective bin based on the sentiment value associated with the user utterance. For example, each bin of the set of bins may include one or more utterances of the set of utterances based on the sentiment value that sentiment model 206 generated.

The system may then determine a sentiment probability of each bin of the set of bins by randomly sampling a subset of utterances corresponding to a respective bin of the set of bins. For example, to reduce the utilization of computational resources conventionally expended by processing a large amount of input data and overcoming the computational infeasibility experienced by existing systems, the system may determine a sentiment probability of each bin. The system may randomly sample a subset of utterances (e.g., ten utterances, five utterances, two utterances, one utterance, etc.) and may determine a sentiment probability for each bin. The sentiment probability may indicate the probability that each utterance within, part of, or associated with a given bin includes a given sentiment. For example, the system may randomly sample a subset of utterances associated with a given bin. For instance, where first bin 210*a* includes 50 utterances associated with the user, the system may select five randomly sampled utterances from first bin 210*a*. The system may then determine, based on the randomly sampled subset of utterances, a sentiment probability of the bin. For example, the sentiment probability may be determined by providing the randomly sampled utterances to a machine learning model configured to output calibrated sentiment probabilities, may be provided to a user (e.g., of the system) for manual analysis, or may be provided to sentiment model 206 to determine the sentiment probability, in accordance with one or more embodiments. In this way, the system may improve sentiment analysis accuracy by verifying whether the randomly sampled utterances actually include a negative sentiment, thereby overcoming the deficiencies of uncalibrated sentiment machine learning models.

Upon determining the sentiment probability, the system may assign the sentiment probability to the respective bin (e.g., first bin 210*a*), indicating that all utterances that are associated with the bin are associated with the determined sentiment probability. For example, the sentiment probability may be a ratio, decimal value, alphanumeric classification, a percentage, or other value. For instance, the sentiment probability may indicate that 95% of the utterances associated with the given bin indicate a given sentiment (e.g., positive, negative, or neutral) of the user.

The system may then determine an overall sentiment probability for the transcript 202 based on the determined sentiment probability of each bin of the set of bins. For example, the system may determine the overall sentiment probability for the transcript using logic component 212. Logic component 212 may be a machine learning model configured to combine, aggregate, or otherwise determine an overall sentiment probability for the transcript based on the sentiment probabilities of each bin of the set of bins 210. In some embodiments, logic component 212 may include one or more statistical or mathematical models for determining the overall sentiment probability. Upon logic component 212 determining the overall sentiment probability 214 for the transcript 202, the system may store the overall sentiment probability 214 for the transcript 202 in one or more databases. For instance, the system may store the overall sentiment probability 214 in association with a user identifier of the user for later retrieval, analysis, or for routing communication requests received by the user. In this way, the system may accurately determine an overall user sentiment while reducing the amount of computer processing and memory resources conventionally utilized when processing large transcripts.

Figure 3:
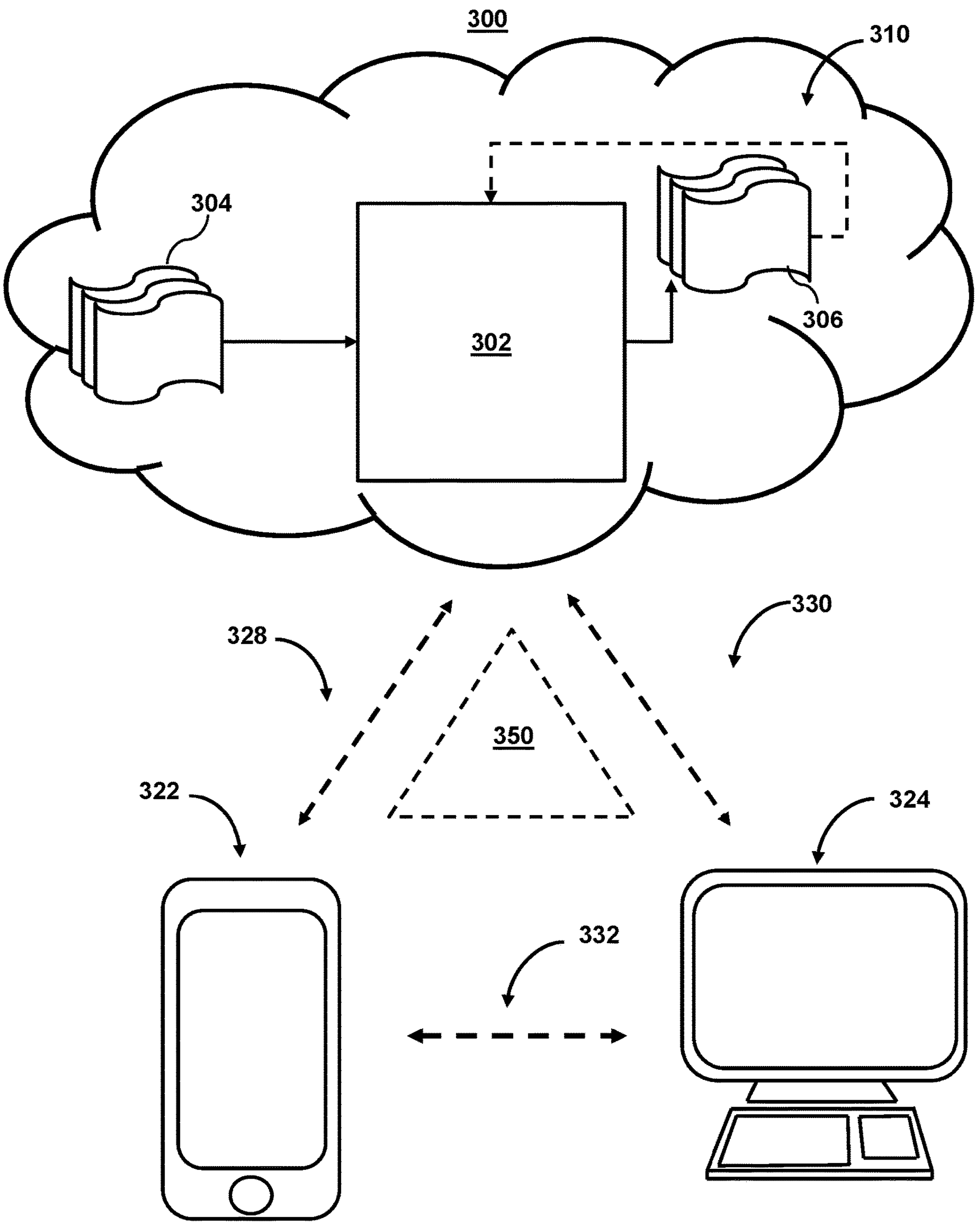
FIG. 3 shows illustrative components for a system used to generate accurate user sentiment classifications while reducing utilization of computational resources associated with determining a user sentiment, in accordance with one or more embodiments.

FIG. 3 shows illustrative components for a system used to generate accurate user sentiment classifications while reducing utilization of computational resources associated with determining a user sentiment, in accordance with one or more embodiments. For example, FIG. 3 may show illustrative components for routing peer-to-peer communications over via telecommunications networks based on user sentiment. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as a touchscreen smartphone and a personal computer, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include server 106 (FIG. 1), sentiment model 206 (FIG. 2), logic component 212 (FIG. 2), one or more databases, or other components. Cloud components 310 may access one or more databases. For example, cloud components 310 may access a system data database, which may store user identifiers (e.g., names, usernames, email addresses, telephone numbers, or other information to identify a user), demographic information of a user, contact information of a user, agent information (e.g., agent identifiers, agent contact information, an assessment value of agent information, expertise of an agent, etc.), or other information. Cloud components 310 may also access a machine learning model database, which may store one or more sentiment machine learning models (trained or untrained), neural networks, training data, training information, or other machine learning model information.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a negative user sentiment, a positive user sentiment, a neutral user sentiment, sentiment values, sentiment probabilities, overall sentiment probabilities, etc.).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., sentiment values, sentiment probabilities, overall sentiment probabilities, etc.)

In some embodiments, the model (e.g., model 302) may automatically perform actions based on outputs 306. In some embodiments, the model (e.g., model 302) may not perform any actions. The output of the model (e.g., model 302) may be used to route peer-to-peer communications via telecommunications networks based on user sentiment (e.g., overall sentiment probabilities).

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC. Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
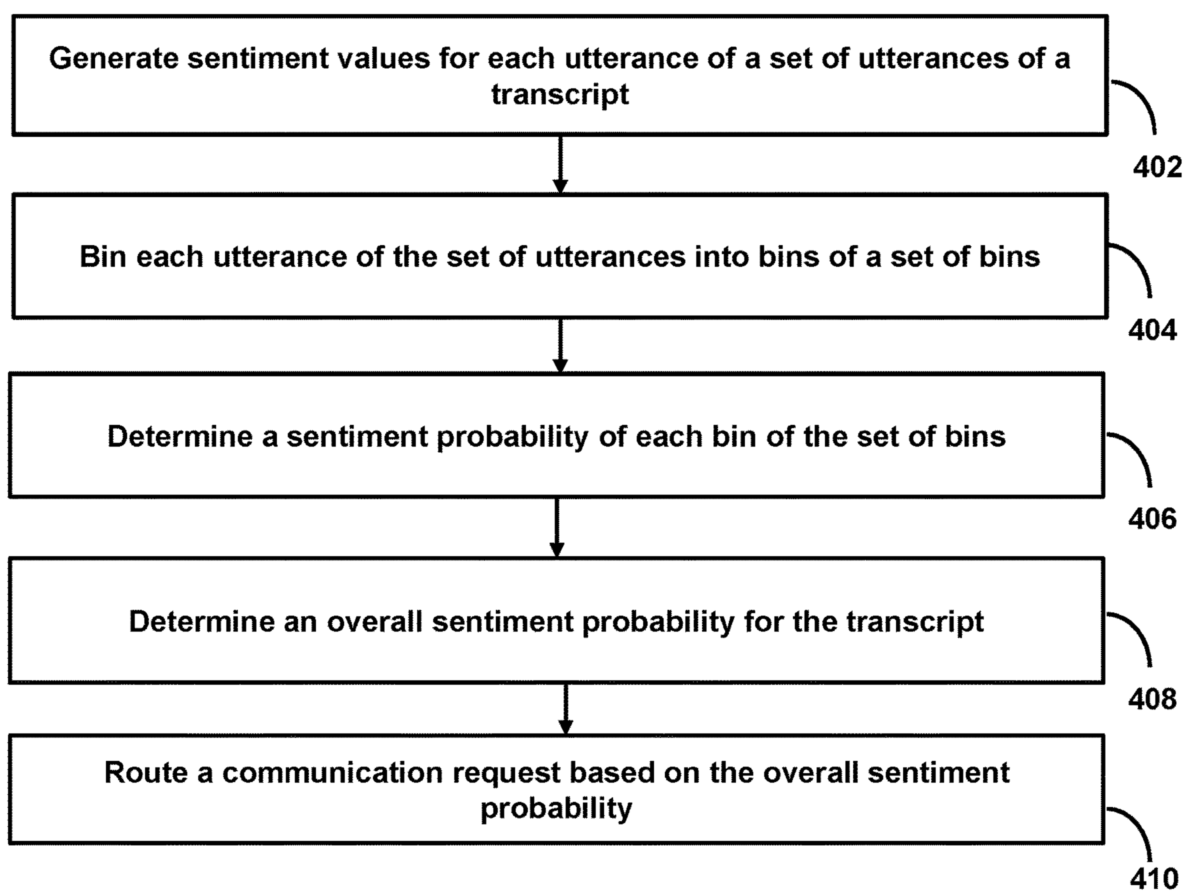
FIG. 4 shows a flowchart of the steps involved in reducing utilization of computational resources associated with determining a user sentiment based on bifurcated user-specific sentiment analysis, in accordance with one or more embodiments.

FIG. 4 shows a flowchart of the steps involved in reducing utilization of computational resources associated with determining a user sentiment based on bifurcated user-specific sentiment analysis, in accordance with one or more embodiments. For example, the system may use process 400 (e.g., as implemented on one or more system components described above) in order to route peer-to-peer communications via telecommunications networks based on bifurcated user-specific sentiment analysis.

At step 402, process 400 (e.g., using one or more components described above) may generate sentiment values for each utterance of a set of utterances of a transcript. For example, the system may generate a sentiment value related to each utterance of a set of utterances associated with the user by providing each utterance of the set of utterances to a sentiment machine learning model. The set of utterances associated with the user may be extracted from a transcript indicating a dialogue between the user and a first agent. As such, the extracted utterances may be of those that are performed, said, or spoken by the user as opposed to the first agent. As an example, the first agent, or alternatively the agent, may be a customer sales associate, a customer service representative, or another user. The system may generate a sentiment value via one or more sentiment machine learning models configured to predict a sentiment of a user utterance. The sentiment value may be a value (e.g., numerical) or a classification (e.g., alphanumeric value). For example, where the sentiment value is a numerical value normalized on a scale zero to one, zero may indicate a more negative sentiment and one may indicate a more positive sentiment, as one of skill in the art would appreciate. In other embodiments, the sentiment value may be a labeled classification (e.g., "positive," "negative," "neutral," "apprehensive," "sad," "happy," or other sentiment). As such, when the system generates a sentiment value, the sentiment value may reflect a negative, positive, neutral, or other sentiment of the user.

The system may generate a sentiment value related to each utterance of a set of utterances associated with the user by providing each utterance to a sentiment machine learning model. For example, as transcripts may include noise (e.g., useless data, such as background noise, long pauses, keyboard typing sounds, nonsense words, or other information that is not related to a sentiment of the user), such noise within the transcript may impact the accuracy of determining a user sentiment of the user. To overcome this, the system may determine a sentiment value for each utterance of the set of utterances associated with the user during an initial processing of the transcript. By doing so, the system determines an initial sentiment classification of each utterance, such that (as will be explained later), the utterances may be binned according to their initial sentiment classification (e.g., sentiment value) to be further processed, thereby improving user sentiment classification accuracy. Additionally, by doing so, the system may reduce the utilization of computational resources when determining a user sentiment. For instance, as existing systems and existing sentiment analysis models are currently limited by the amount of data they can effectively receive as input, and due to the computational infeasibility of processing large input data, such as a transcript, the system may break down the input data into a set of utterances to provide each utterance to a sentiment machine learning model.

In some embodiments, the system may extract the set of utterances associated with the user based on an identifier associated with the user. For example, the system may receive a transcript of a dialogue between a user and an agent (e.g., the first agent). For instance, the system may receive (or alternatively retrieve) the transcript from a database, or in the context of a live call, may generate the transcript in real (or near-real) time. The system may perform natural language processing on the transcript to determine an identifier associated with the user and the agent, respectively. For example, the identifier may be a username, screen name, telephone number, email address, a communication channel identifier, or other information related to identifying a user. The system may use the identifier associated with the user to extract the set of utterances associated with the user. For example, the system may parse the transcript to extract utterances, sequences of words, sentences, or other utterance-related information that is associated with the identifier of the user. In this way, the system may reduce the amount of computer memory utilized storing utterances of a dialogue, thereby increasing computational efficiency by processing only utterances associated with the user (e.g., as opposed to both the user and the agent).

At step 404, process 400 (e.g., using one or more components described above) may bin each utterance of the set of utterances into bins of a set of bins. For example, the system may bin each utterance of the set of utterances associated with the user into a set of bins based on the sentiment values related to a respective utterance of the set of utterances. For instance, the system may generate a set of bins, where each bin is associated with a numerical range of sentiment values. In this way, as will be discussed, the system may improve user sentiment classification accuracy by categorizing each utterance into a respective bin.

In some embodiments, each bin of the set of bins may be associated with a non-overlapping numerical range of sentiment values. For example, each bin may correspond to a given range of sentiment values, such as [0.0,0.01), [0.01, 0.02), [0.02,0.03) . . . , [0.99,1.0). That is, where a parenthesis "(" indicates a non-inclusive value and a bracket "[" indicates an inclusive value. Each utterance of the set of utterances may be binned (e.g., grouped, assigned, placed, etc.) into a bin based on (i) the sentiment value associated with the bin and (ii) the sentiment value associated with the utterance. For example, an utterance of the set of utterances may be associated with a sentiment value of 0.11. As such, the utterance may be binned into a bin with a sentiment value range of [0.01,0.02). In this way, the system may group utterances together based on their sentiment value, thereby reducing the amount of computational resources utilized when determining sentiment probabilities for each utterance of the utterance.

In some embodiments, each utterance associated with a respective bin of the set of bins is associated with the same sentiment probability of that of the respective bin. For example, when determining an overall sentiment of a transcript, the system may randomly sample utterances associated with a given bin of the set of bins. The system may use the randomly sampled utterances to determine a sentiment probability of all utterances within the bin. That is, each utterance that is associated with a bin (e.g., utterances having a sentiment value that is within the sentiment value range of the bin) may be assigned a sentiment probability value to that of the randomly sampled utterance's sentiment probability value. In this way, the system may improve computational efficiency by assigning all utterances associated with a respective bin the same sentiment probability as that of the randomly sampled utterance's sentiment probability.

At step 406, process 400 (e.g., using one or more components described above) may determine a sentiment probability of each bin of the set of bins. For example, the system may determine a sentiment probability of each bin of the set of bins by randomly sampling a subset of utterances corresponding to a respective bin of the set of bins. As existing sentiment models are unable to process a large amount of input data (e.g., a transcript) due to the computational infeasibility of processing such, the system may randomly sample a subset of utterances within a respective bin to determine a sentiment probability for the given bin. The system may repeat this process to determine a sentiment probability for each bin of the set of bins. The advantage of randomly sampling a subset of utterances of each bin of the set of bins is realized by processing a smaller set of the set of utterances of each bin. That is, as opposed to using the set of utterances associated with the user within the respective bin, the system may randomly sample a subset (e.g., a smaller set of the utterances within the bin) to determine whether the set of utterances that are associated with such bin are actually (e.g., are verified to be) associated with a given sentiment. As such, the system need not verify the set of utterances associated with the user, but rather a subset, thereby reducing the amount of computational resources expended to determine a user sentiment of a transcript.

In some embodiments, the system may determine the sentiment probability of each bin of the set of bins by using a machine learning model. For example, the system may provide the randomly sampled subset of utterances corresponding to a respective bin of the set of bins to a machine learning model. The machine learning model may be configured to determine the sentiment probability of the respective bin. The machine learning model may learn abstract associations between utterances that a human may not be able to understand or comprehend.

For example, the machine learning model may be trained on training data. The system may obtain training data including a set of training utterances, a set of labels indicating training sentiment values (e.g., where each label of the set of labels corresponds to a respective training utterance of the set of training utterances), and a training sentiment probability label indicating a sentiment probability associated with the set of training utterances. As each utterance may be labeled with a sentiment value (e.g., via a sentiment machine learning model) and a training sentiment probability label (e.g., indicating the probability that all utterances of the set of training utterances indicate a given sentiment, such as a positive, neutral or negative sentiment), the system may provide such training data to a training routine of the machine learning model to train the machine learning model. Using the training data, as mentioned above, the machine learning model may learn abstract associations between the input data that is not easily understood or uncovered by a human. In this way, the system may generate better predictions as to whether utterances include a given sentiment.

In some embodiments, the system may receive a user input indicating a sentiment probability of a respective bin of the set of bins. For example, the system may select the randomly sampled subset of utterances associated with the user from each bin of the set of bins. The system may then receive a user input indicating a sentiment probability of the respective bin of the set of bins based on the randomly sampled subset of utterances associated with the user corresponding to the respective bin of the set of bins. For example, the user may perform a manual analysis of the randomly sampled utterances corresponding to each bin of the set of bins to assign each respective bin a sentiment probability of the bin (e.g., 95% of the randomly sampled utterances within the bin include a negative sentiment, 3% of the randomly sampled utterances within the bin include a positive sentiment, 50% of the randomly sampled utterances within the bin include a negative sentiment, etc.). In this way, the system may avoid complications of weak sentiment machine learning models by verifying the output of such sentiment machine learning models with user indications of sentiment probabilities.

In some embodiments, the system may generate training data for training machine learning model based on user inputs. For example, the system may generate training data based on (i) the randomly sampled subset of utterances corresponding to a respective bin of a set of bins, (ii) the sentiment values related to each utterance of the randomly sampled utterances corresponding to (e.g., part of, within, etc.) the respective bin of the set of bins, and (iii) the user input indicating a label indicating the sentiment probability of the bin based on the randomly sampled subset of utterances. That is, due to the lack of training data available, and to increase and optimize the utilization of computer resources that would otherwise be wasted when manually labeling training data, the system may generate its own training data based on historically labeled data.

For example, where a user has manually labeled sentiment probabilities of bins based on a manual analysis of utterances within a given bin, the system may leverage such information to automatically generate its own sentiment probabilities to new bins of a set of bins. As such, the system may generate the training data including the randomly sampled subset of utterances, the sentiment values related to each, and the label indicating user-indicated sentiment probability of the bin to train a machine learning model configured to generate sentiment probabilities of randomly sampled utterances corresponding to one or more new bins generated by the system.

At step 408, process 400 (e.g., using one or more components described above) may determine an overall sentiment probability for the transcript. For example, the system may determine an overall sentiment probability for the transcript based on the determined sentiment probability of each bin of the set of bins. To overcome the technical deficiencies of existing systems limited by input data size and the computational infeasibility of sentiment analysis models, the system may determine an overall sentiment probability for the transcript based on the sentiment probabilities of the bins. For example, the system may combine, aggregate, or otherwise use the determined sentiment probabilities for each bin of the bins to determine the overall sentiment probability for the transcript.

In some embodiments, determining the overall sentiment probability for the transcript may be based on a condition being satisfied. For example, the system may sort each utterance of the set of utterances in descending order based on their determined/assigned sentiment probability. As each utterance that is associated with a respective bin is assigned the same sentiment probability (e.g., via the randomly sampled utterance's sentiment probability), the system may sort each utterance in descending order based on the sentiment probabilities.

The system may select from the sorted utterances (e.g., a sorted list, a sorted data structure, etc.) a number of sentiment probabilities associated with the set of utterances that satisfy a condition. For example, the system may select the top five, top four, top ten, or top k (where k is any number), of utterances from the set of utterances. For instance, where the condition is the "top five," where "top" means "highest sentiment probability," the system may select five utterances that are associated with the highest sentiment probabilities when compared to all utterances/sentiment probabilities of the set of utterances associated with the user. In some embodiments, where the first condition is a threshold sentiment probability, the system may select all utterances that meet or exceed the threshold sentiment probability.

The system may then determine the overall sentiment probability for the transcript based on the selected number of sentiment probabilities. For example, the system may aggregate the sentiment probabilities of the selected utterances (or the selected number of sentiment probabilities) to determine the overall sentiment probability for the transcript. The system may aggregate the sentiment probabilities and determine the overall sentiment probability for the transcript based on an average, weighted average, or other mathematical calculation. As an example, where three utterances are selected having respective sentiment probabilities of 0.99, 0.88, and 0.76, the system may calculate an overall sentiment probability using the sentiment probabilities of 0.99, 0.88, and 0.76.

In some embodiments, the overall probability may be determined via the formula $OP=(1-(1-p1)(1-p2)(1-p3)(1-p4)(1-p5)\ldots(1-pk))$ where OP is the overall sentiment probability and k is the selected number of sentiment probabilities. Continuing with the example above, the overall sentiment probability may be determined as $OP=(1-(1-0.99)(1-0.88)(1-0.76))=0.999712$. In this way, the system may optimize utilization of computational resources by determining an overall sentiment value of the transcript based on a subset of sentiment values of utterances.

In some embodiments, the system may link the overall sentiment probability for the transcript to a user identifier associated with the user. For example, to determine whether a user has previously experienced a positive, neutral, or negative user experience when interacting with an agent, the system may store information pertaining to the overall sentiment probability of the user. For example, the system may store the overall sentiment probability in a database configured to map overall sentiment probabilities to user identifiers. By doing so, the system may determine which users have had a positive, neutral, or negative experience in the past, thereby enabling the system to effectively route communication requests from users to effective agents.

At step 410, process 400 (e.g., using one or more components described above) may route a communication request based on the overall sentiment probability. For example, in response to receiving a communication request from the user, the system may route the communication request to a second agent based on the overall sentiment probability satisfying a threshold sentiment probability. For instance, the system may route a call to another customer service representative that is qualified to handle a frustrated user (or a user experiencing a particular problem) in response to receiving an inbound call from the user. In some embodiments, the system may route the call (e.g., in real-time or near-real time) during a conversation with an agent to another agent. For instance, where the user is associated with a sentiment probability satisfying a threshold sentiment probability, the system may route the call to another agent equipped to handle the call. In some embodiments, the overall sentiment probability may satisfy the threshold sentiment probability where the sentiment probability meets or exceeds the threshold sentiment probability. In this way, the user experience is improved by routing frustrated callers to agents more adept to handling an issue or problem being experienced by the user.

In some embodiments, the system may route the communication request from the user to the second agent based on the second agent being associated with an assessment value satisfying a threshold assessment value. For example, the system may determine, among a set of available agents, an agent that is associated with an assessment value satisfying a threshold assessment value. The assessment value may be a rating, score, or other numerical value that is related to a problem-solving characteristic of the agent. Similarly, the threshold assessment value may be a threshold rating, score, or other numerical value. The assessment value may satisfy the threshold assessment value when the assessment value meets or exceeds the threshold assessment value. To improve the user experience and reduce user frustration, the system may route a frustrated user to an agent (e.g., a customer service representative) that is highly qualified or highly rated to solve the user's problems.

In response to determining that an agent (e.g., of a set of agents) is associated with an assessment value satisfying the threshold assessment value, the system may determine a communication channel identifier associated with the agent. For example, the communication channel identifier may be an email address, phone number, username, temporary contact information, or other communication channel identifier associated with the agent configured to connect a user to the agent. The system may then route the communication request to the agent based on the communication channel identifier. For example, where the communication request is an in-bound telephone call, the system may route the in-bound telephone call to the agent via a telephone number associated with the agent. In this way, the system may prioritize incoming communication requests of users based on user frustration determined by prior communications, thereby improving the user experience while decreasing the amount of network traffic otherwise experienced by routing communication requests to inadequate agents.

In some embodiments, the system may use a set of sentiment machine learning models to determine a combined overall sentiment probability for the transcript. For example, similar to as described above, the system may use a set of sentiment machine learning models to determine sentiment values related to each utterance of set of utterances associated with the user. The system may then bin each utterance of the set of utterances associated with the user based on the sentiment values generated by each respective model. For example, where five sentiment machine learning models are used to generate sentiment values of each utterance of the user, the system may generate five sets of bins.

The system may then determine a sentiment probability of each bin of a given set of bins by randomly sampling a subset of utterance corresponding to each respective bin of the set of bins. Using the sentiment probabilities of each bin, the system may determine an overall sentiment probability for the transcript based on the sentiment probabilities of each bin of the set of bins. Continuing with the example above, as five sets of bins have been generated, for each bin in each set of bins, the system may determine the overall sentiment probability for the transcript based on the sentiment probabilities corresponding to each bin of the set bins within a given set of bins. That is, five overall sentiment probability values may be generated, where each overall sentiment probability is related to a given sentiment probability machine learning model.

The system may then determine a combined overall sentiment probability for the transcript based on the overall sentiment probability values. For example, the combined overall sentiment probabilities may be an average, weighted average, or other mathematical or statistical function of the overall sentiment probability values. For instance, where five overall sentiment probabilities are generated, the system may average the five overall sentiment probabilities together to determine the combined overall sentiment probability for the transcript. The system may then route the communication request to the second agent based on the combined overall sentiment probability for the transcript satisfying a threshold combined overall sentiment probability in lieu of the overall sentiment probability for the transcript satisfying the threshold sentiment probability.

In some embodiments, the combined overall sentiment probability may satisfy the threshold combined overall sentiment probability when the combined overall sentiment probability meets or exceeds the threshold combined overall sentiment probability. For example, the system may use the combined overall sentiment probability to route the communication request to the second agent over the previously determined overall sentiment probability to provide more effective communication request routing to effective agents. In this way, the system may improve sentiment analysis by using a set of sentiment machine learning models, thereby overcoming machine learning model bias caused by weak machine learning model predictions.

In some embodiments, sentiments may be associated with a sentiment characteristic of a set of sentiment characteristics. For example, a sentiment characteristic may refer to a sentiment type of a set of sentiment types. The sentiment characteristic may be a positive, neutral, or negative sentiment characteristic. To determine an overall sentiment of a transcript between a user and an agent, it may be advantageous to determine whether there is a positive sentiment, negative sentiment, or neutral sentiment. As such, the system may be configured for determining whether a sentiment is positive, negative, or neutral.

For instance, in the context of negative sentiments, the system may be configured to determine a probability of a negative sentiment of a conversation between a user (e.g., a customer) and an agent (e.g., sales representative) to route a call (e.g., in real time or in the future) to an agent that may have better experience in resolving an issue. As such, each of the sentiment values, sentiment probabilities, and overall sentiment probabilities may be associated with a positive, neutral, or negative sentiment. In this way, the system may be configured to determine a variety of sentiments of users as opposed to being limited to determining a single sentiment.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising generating a sentiment value related to each utterance of a set of utterances associated with a user by providing each utterance of the set of utterances to a sentiment machine learning model, wherein the set of utterances is extracted from a transcript of a dialogue between the user and a first agent; binning each utterance of the set of utterances associated with the user into a set of bins based on the sentiment values related to a respective utterance of the set of utterances; determining a sentiment probability of each bin of the set of bins by randomly sampling a subset of utterances corresponding to a respective bin of the set of bins, wherein each bin of the set of bins is associated with a range of sentiment values; determining an overall sentiment probability for the transcript based on the determined sentiment probability of each bin of the set of bins; and in response to receiving a communication request from the user, routing the communication request to a second agent based on the overall sentiment probability satisfying a threshold sentiment probability.
2. The method of any one of the preceding embodiments, wherein each utterance associated with the respective bin of the set of bins is associated with the same sentiment probability of that of the respective bin.
3. The method of any one of the preceding embodiments, wherein determining the overall sentiment probability for the transcript further comprises: sorting, in descending order, each utterance of the set of utterances based on the associated sentiment probability of a respective utterance of the set of utterances; selecting, from the sorted utterances, a number of sentiment probabilities associated with the set of utterances that satisfy a first condition; and determining the overall sentiment probability for the transcript based on the selected number of sentiment probabilities.
4. The method of any one of the preceding embodiments, wherein determining the sentiment probability of each bin of the set of bins further comprises: providing, for each bin of the set of bins, the randomly sampled subset of utterances corresponding to the respective bin of the set of bins, to a machine learning model configured to determine the sentiment probability of the respective bin.
5. The method of any one of the preceding embodiments, further comprising: obtaining training data comprising (i) a set of training utterances, (ii) a set of labels indicating training sentiment values, wherein each label of the set of labels corresponds to a respective training utterance of the set of training utterances, and (iii) a training sentiment probability label indicating a training sentiment probability associated with the set of training utterances; and providing the training data to a training routine of the machine learning model to train the machine learning model.
6. The method of any one of the preceding embodiments, further comprising: selecting, for each bin of the set of bins, the randomly sampled subset of utterances associated with the user corresponding to the respective bin of the set of bins; and receiving a user input indicating labels corresponding to each bin of the set of bins, wherein the labels indicate a user-derived sentiment probability of the respective bin of the set of bins based on the randomly sampled subset of utterances associated with the user corresponding to the respective bin of the set of bins.
7. The method of any one of the preceding embodiments, further comprising: generating training data based on (i) the randomly sampled subset of utterances corresponding to the respective bin of the set of bins, (ii) the sentiment values related to each utterance of the randomly sampled subset of utterances corresponding to the respective bin of the set of bins, and (iii) the user input indicating a label corresponding to each bin of the set of bins.
8. The method of any one of the preceding embodiments, further comprising: generating a second sentiment value related to each second utterance of a set of second utterances associated with the user by providing each utterance of the set of second utterances to a second sentiment machine learning model; binning each second utterance of the set of second utterances associated with the user into a set of second bins based on the second sentiment values related to a respective second utterance of the set of second utterances; determining a second sentiment probability of each second bin of the set of second bins by randomly sampling a second subset of utterances corresponding to a second respective bin of the set of second bins, wherein each second bin of the set of second bins is associated with a second range of second sentiment values; determining a second overall sentiment probability for the transcript based on the determined second sentiment probability of each bin of the set of bins; determining a combined overall sentiment probability for the transcript based on (i) the overall sentiment probability for the transcript and (ii) the second overall sentiment probability for the transcript; and routing the communication request to the second agent based on the combined overall sentiment probability for the transcript satisfying a threshold combined overall sentiment probability in lieu of the overall sentiment probability for the transcript satisfying the threshold sentiment probability.
9. The method of any one of the preceding embodiments, wherein routing the communication request to the second agent further comprises: determining that the second agent is associated with an assessment value satisfying a threshold assessment value; in response to determining that the second agent is associated with the assessment value satisfying the threshold assessment value, determining a communication channel identifier associated with the second agent; and routing the communication request to the second agent based on the communication channel identifier.
10. The method of any one of the preceding embodiments, further comprising: linking the overall sentiment probability for the transcript to a user identifier associated with the user, wherein the linking comprises storing the overall sentiment probability for the transcript in a database indicating a mapping between (i) overall sentiment probabilities of transcripts and (ii) user identifiers.
11. The method of any one of the preceding embodiments, further comprising: receiving the transcript of the dialogue between the user and the first agent; performing natural language processing on the transcript to determine an identifier associated with the user; and extracting, based on the identifier associated with the user, the set of utterances associated with the user.

12. The method of any one of the preceding embodiments, wherein the sentiment value, the sentiment probability, and the overall sentiment probability is associated with a sentiment characteristic of a set of sentiment characteristics.

13. The method of any one of the preceding embodiments, wherein each bin of the set of bins is associated with a non-overlapping numerical range of sentiment values.

14. A tangible, non-transitory, machine-readable medium storing instructions that, when executed by a data processing apparatus, cause the data processing apparatus to perform operations comprising those of any of embodiments 1-13.

15. A system comprising one or more processors; and memory storing instructions that, when executed by the processors, cause the processors to effectuate operations comprising those of any of embodiments 1-13.

16. A system comprising means for performing any of embodiments 1-13.

What is claimed is:

1. A system for routing peer-to-peer communications via telecommunications networks based on bifurcated user-specific sentiment analysis, the system comprising:

one or more processors and non-transitory computer-readable media comprising instructions that, when executed by the one or more processors, perform operations comprising:

receiving a transcript of a dialogue between a user and an agent, the transcript comprising utterances between the user and the agent;

extracting, from the transcript, a set of utterances associated with the user;

providing the set of utterances associated with the user to each of a plurality of sentiment machine learning models configured to output a sentiment value for each utterance of the set of utterances associated with the user;

binning each utterance of the set of utterances associated with the user into one or more bins based on the sentiment values, wherein each bin of the one or more bins corresponds to a non-overlapping numerical range of sentiment values;

determining, for each bin of the one or more bins, a negative-sentiment probability associated with a respective bin based on randomly sampling a subset of the set of utterances in the respective bin;

determining an overall negative-sentiment probability for the transcript based on the negative-sentiment probability associated with each bin of the one or more bins;

linking the overall negative-sentiment probability for the transcript to a user identifier associated with the user;

in response to receiving a communication request from the user comprising the user identifier, determining whether the overall negative-sentiment probability linked to the user identifier satisfies a threshold negative-sentiment probability value; and routing the communication request to a second agent in response to the overall negative-sentiment probability satisfying the threshold negative-sentiment probability value.

2. A method for routing peer-to-peer communications via telecommunications networks based on bifurcated user-specific sentiment analysis, the method comprising:

extracting, from a transcript of a dialogue between a user and a first agent, a set of utterances associated with the user;

generating a sentiment value related to each utterance of the set of utterances associated with the user by providing each utterance of the set of utterances to a sentiment machine learning model;

binning each utterance of the set of utterances associated with the user into a set of bins based on the sentiment values, wherein each bin of the set of bins corresponds to a non-overlapping numerical range of sentiment values;

determining, for each bin of the set of bins, a sentiment probability corresponding to a respective bin based on randomly sampling a subset of utterances in the respective bin;

determining an overall sentiment probability for the transcript based on the sentiment probability corresponding to each bin of the set of bins;

linking the overall sentiment probability for the transcript to a user identifier associated with the user; and in response to receiving a communication request from the user comprising the user identifier, routing the communication request to a second agent based on the overall sentiment probability linked to the user identifier satisfying a threshold sentiment probability.

3. The method of claim 2, wherein each utterance in the respective bin is associated with the same sentiment probability corresponding to the respective bin.

4. The method of claim 3, wherein determining the overall sentiment probability for the transcript further comprises:

sorting, in descending order, each utterance of the set of utterances based on the associated sentiment probability of a respective utterance of the set of utterances;

selecting, from the sorted utterances, a number of sentiment probabilities associated with the set of utterances that satisfy a first condition; and determining the overall sentiment probability for the transcript based on the selected number of sentiment probabilities.

5. The method of claim 2, wherein determining, for each bin of the set of bins, the sentiment probability corresponding to the respective bin further comprises:

providing the randomly sampled subset of utterances corresponding to the respective bin as input to a machine learning model configured to determine the sentiment probability corresponding to the respective bin.

6. The method of claim 5, further comprising:

obtaining training data comprising (i) a set of training utterances, (ii) a set of labels indicating training sentiment values, wherein each label of the set of labels corresponds to a respective training utterance of the set of training utterances, and (iii) a training sentiment probability label indicating a training sentiment probability associated with the set of training utterances; and providing the training data to a training routine of the machine learning model to train the machine learning model.

7. The method of claim 2, further comprising:

selecting, for each bin of the set of bins, the randomly sampled subset of utterances corresponding to the respective bin; and receiving a user input indicating labels corresponding to each bin of the set of bins, wherein the labels indicate a user-derived sentiment probability corresponding to the respective bin based on the randomly sampled subset of utterances corresponding to the respective bin.

8. The method of claim 7, further comprising:

generating training data based on (i) the randomly sampled subset of utterances corresponding to the respective bin of the set of bins, (ii) the sentiment values related to each utterance of the randomly sampled subset of utterances corresponding to the respective bin of the set of bins, and (iii) the user input indicating the labels corresponding to each bin of the set of bins.

9. The method of claim 2, further comprising:

generating a second sentiment value related to each second utterance of a set of second utterances associated with the user by providing each utterance of the set of second utterances to a second sentiment machine learning model;

binning each second utterance of the set of second utterances associated with the user into a set of second bins based on the second sentiment values related to a respective second utterance of the set of second utterances;

determining, for each second bin of the set of bins, a second sentiment probability corresponding to a respective second bin based on randomly sampling a second subset of utterances in the second respective bin, wherein each second bin of the set of second bins is associated with a second range of second sentiment values;

determining a second overall sentiment probability for the transcript based on the second sentiment probability corresponding to each second bin of the set of second bins;

determining a combined overall sentiment probability for the transcript based on (i) the overall sentiment probability for the transcript and (ii) the second overall sentiment probability for the transcript; and routing the communication request to the second agent based on the combined overall sentiment probability for the transcript satisfying a threshold combined overall sentiment probability in lieu of the overall sentiment probability for the transcript satisfying the threshold sentiment probability.

10. The method of claim 2, wherein routing the communication request to the second agent further comprises:

determining that the second agent is associated with an assessment value satisfying a threshold assessment value;

in response to determining that the second agent is associated with the assessment value satisfying the threshold assessment value, determining a communication channel identifier associated with the second agent; and routing the communication request to the second agent based on the communication channel identifier.

11. The method of claim 2, wherein the linking comprises storing the overall sentiment probability for the transcript in a database indicating a mapping between (i) overall sentiment probabilities of transcripts and (ii) user identifiers.

12. The method of claim 2, further comprising:

receiving the transcript of the dialogue between the user and the first agent;

performing natural language processing on the transcript to determine an identifier associated with the user; and extracting, based on the identifier associated with the user, the set of utterances associated with the user.

13. The method of claim 2, wherein the sentiment value, the sentiment probability, and the overall sentiment probability is associated with a sentiment characteristic of a set of sentiment characteristics.

14. One or more non-transitory, computer-readable media comprising instructions that, when executed by one or more processors, perform operations comprising:

extracting, from a transcript of a dialogue between a user and a first agent, a set of utterances associated with the user;

generating a sentiment value related to each utterance of the set of utterances associated with the user by providing each utterance of the set of utterances to a sentiment machine learning model;

binning each utterance of the set of utterances associated with the user into a set of bins based on the sentiment values, wherein each bin of the set of bins corresponds to a non-overlapping range of sentiment values;

determining, for each bin of the set of bins, a sentiment probability corresponding to a respective bin based on randomly sampling a subset of utterances in the respective bin;

determining an overall sentiment probability for the transcript based on the sentiment probability corresponding to each bin of the set of bins;

linking the overall sentiment probability for the transcript to a user identifier associated with the user; and in response to receiving a communication request from the user comprising the user identifier, routing the communication request to a second agent based on the overall sentiment probability linked to the user identifier satisfying a threshold sentiment probability.

15. The non-transitory, computer-readable media of claim 14, wherein the instructions that, when executed by the one or more processors, perform operations further comprising:

wherein each utterance in the respective bin is associated with the same sentiment probability corresponding to the respective bin.

16. The non-transitory, computer-readable media of claim 15, wherein the instructions that, when executed by the one or more processors, perform operations further comprising:

sorting, in descending order, each utterance of the set of utterances based on the associated sentiment probability of a respective utterance of the set of utterances;

selecting, from the sorted utterances, a number of sentiment probabilities associated with the set of utterances that satisfy a first condition; and determining the overall sentiment probability for the transcript based on the selected number of sentiment probabilities.

17. The non-transitory, computer-readable media of claim 14, wherein the instructions that, when executed by the one or more processors, perform operations further comprising:

generating a second sentiment value related to each second utterance of a set of second utterances associated with the user by providing each utterance of the set of second utterances to a second sentiment machine learning model;

binning each second utterance of the set of second utterances associated with the user into a set of second bins based on the second sentiment values related to a respective second utterance of the set of second utterances;

determining, for each second bin of the set of second bins, a second sentiment probability corresponding to a respective second bin based on randomly sampling a second subset of utterances in the second respective bin, wherein each second bin of the set of second bins is associated with a second range of second sentiment values;

determining a second overall sentiment probability for the transcript based on the second sentiment probability corresponding to each second bin of the set of second bins;

determining a combined overall sentiment probability for the transcript based on (i) the overall sentiment probability for the transcript and (ii) the second overall sentiment probability for the transcript; and routing the communication request to the second agent based on the combined overall sentiment probability for the transcript satisfying a threshold combined overall sentiment probability in lieu of the overall sentiment probability for the transcript satisfying the threshold sentiment probability.

18. The non-transitory, computer-readable media of claim 14, wherein routing the communication request to the second agent further comprises:

determining that the second agent is associated with an assessment value satisfies a threshold assessment value;

in response to determining that the second agent is associated with the assessment value satisfying the threshold assessment value, determining a communication channel identifier associated with the second agent; and routing the communication request to the second agent based on the communication channel identifier.

19. The non-transitory, computer-readable media of claim 14, wherein the sentiment value, the sentiment probability, and the overall sentiment probability is associated with a sentiment characteristic of a set of sentiment characteristics.

20. The non-transitory, computer-readable media of claim 14, wherein the linking comprises storing the overall sentiment probability for the transcript in a database indicating a mapping between (i) overall sentiment probabilities of transcripts and (ii) user identifiers.

* * * * *